(12) United States Patent
Fukutomi et al.

(10) Patent No.: US 7,063,115 B2
(45) Date of Patent: Jun. 20, 2006

(54) PNEUMATIC TIRE

(75) Inventors: Takashi Fukutomi, Hiratsuka (JP); Satoshi Makino, Wako (JP); Takayuki Toyoshima, Wako (JP)

(73) Assignees: The Yokohama Rubber Co., Ltd., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 176 days.

(21) Appl. No.: 10/467,015

(22) PCT Filed: Mar. 25, 2002

(86) PCT No.: PCT/JP02/02846

§ 371 (c)(1),
(2), (4) Date: Aug. 4, 2003

(87) PCT Pub. No.: WO02/076769

PCT Pub. Date: Oct. 3, 2002

(65) Prior Publication Data

US 2004/0069387 A1    Apr. 15, 2004

(30) Foreign Application Priority Data

Mar. 27, 2001  (JP) ............................. 2001-090553

(51) Int. Cl.
 *B60C 19/12* (2006.01)
(52) U.S. Cl. ...................................... 152/502; 152/192
(58) Field of Classification Search ................ 152/502, 152/508, 510–512, 192, 194, 204, 206
See application file for complete search history.

(56) References Cited

U.S. PATENT DOCUMENTS

| 495,777 | A | * | 4/1893 | Bouéry | 152/502 |
| 1,285,719 | A | * | 11/1918 | Jeffries | 152/506 |
| 1,430,795 | A | * | 10/1922 | Chappell | 152/502 |
| 1,810,038 | A | * | 6/1931 | Crossan | 152/506 |

FOREIGN PATENT DOCUMENTS

| JP | 60-154904 A1 | 8/1985 |
| JP | 04-212607 A1 | 8/1992 |
| JP | 2002-036813 A1 | 2/2002 |

OTHER PUBLICATIONS

International Search Report for PCT/JP02/02846 mailed on Jun. 25, 2002.

* cited by examiner

*Primary Examiner*—Geoffrey L. Knable
(74) *Attorney, Agent, or Firm*—Rader, Fishman & Grauer PLLC

(57) ABSTRACT

A pneumatic tire which makes it possible to effectively prevent puncture during running without involving a large increase in weight or degradation of riding comfortability. This pneumatic tire has a plurality of films disposed in the manner of fish scales in at least a region corresponding to a tread portion of an inner surface of the tire, each of the films being partially fixed on the inner surface of the tire, the fixed portions of the films being covered by the non-fixed portions of the other films.

8 Claims, 3 Drawing Sheets

PNEUMATIC TIRE

BACKGROUND OF THE INVENTION

1. Field of the Invention

The present invention concerns a pneumatic tire provided with a punctureless function, and more particularly a pneumatic tire composed to prevent puncture during running without involving a large increase in weight or degradation of comfortable ride.

2. Detailed Description of the Related Art

The pneumatic tire may get punctured by a nail or the like during the running. There, punctureless structures such as dispose of sealant on the inner surface of the tire or embedment of steel pieces in the manner of fish scales in the tread portion for reinforcement of the inner liner have been proposed in order to prevent punctures due to a stuck nail or others during the running.

However, in case of arranging sealant on the inner surface of the tire, the weight increases remarkably to obtain a sufficient puncture prevention function and moreover, if sealant is arranged in an area corresponding to the side portion of the inner surface of the tire, there was a problem that sealant flows to the tread side by a centrifugal force during the tire rotation. In addition, in case of embedding scales like steel pieces in the tread portion, there was a problem of large increase in weight and, at the same time, deterioration of the comfortable ride.

SUMMARY OF THE INVENTION

The present invention has an object to provide a pneumatic tire which makes it possible to effectively prevent puncture during running without involving a large increase in weight or degradation of comfortable ride.

The pneumatic tire in order to achieve the aforementioned object is characterized by disposing a plurality of films in the manner of fish scales at least in a region corresponding to a tread portion of an inner surface of the tire, partially fixing each of the films on the inner surface of the tire, and covering the fixed portions of the films with the non-fixed portions of the other films.

In case of disposing a plurality of films in the manner of fish scales on the inner surface of the tire, when a nail or the like is stuck, the film of that position deforms in a way to escape from the nail or the like. If the nail or the like is drawn out, the film that has been deformed restitutes the original shape by its own elasticity and the inner pressure of the tire and turns up to obstruct the hole. Thus, it is possible to effectively prevent the puncture during running. In addition, as the film can be made of a light material such as nonmetallic materials presenting flexibility, a large increase in weight or degradation of comfortable ride is involved hardly.

In the present invention, the film is preferably 0.02 mm or more in thickness and 4.0 cm² or less in area. The films can be made to function satisfactorily as a valve, by setting the dimensions of the films to the aforementioned range.

DETAILED DESCRIPTION OF THE PREFERRED EMBODIMENT

Now, a composition of the present invention shall be described in detail referring to the attached drawings.

Figure 1:
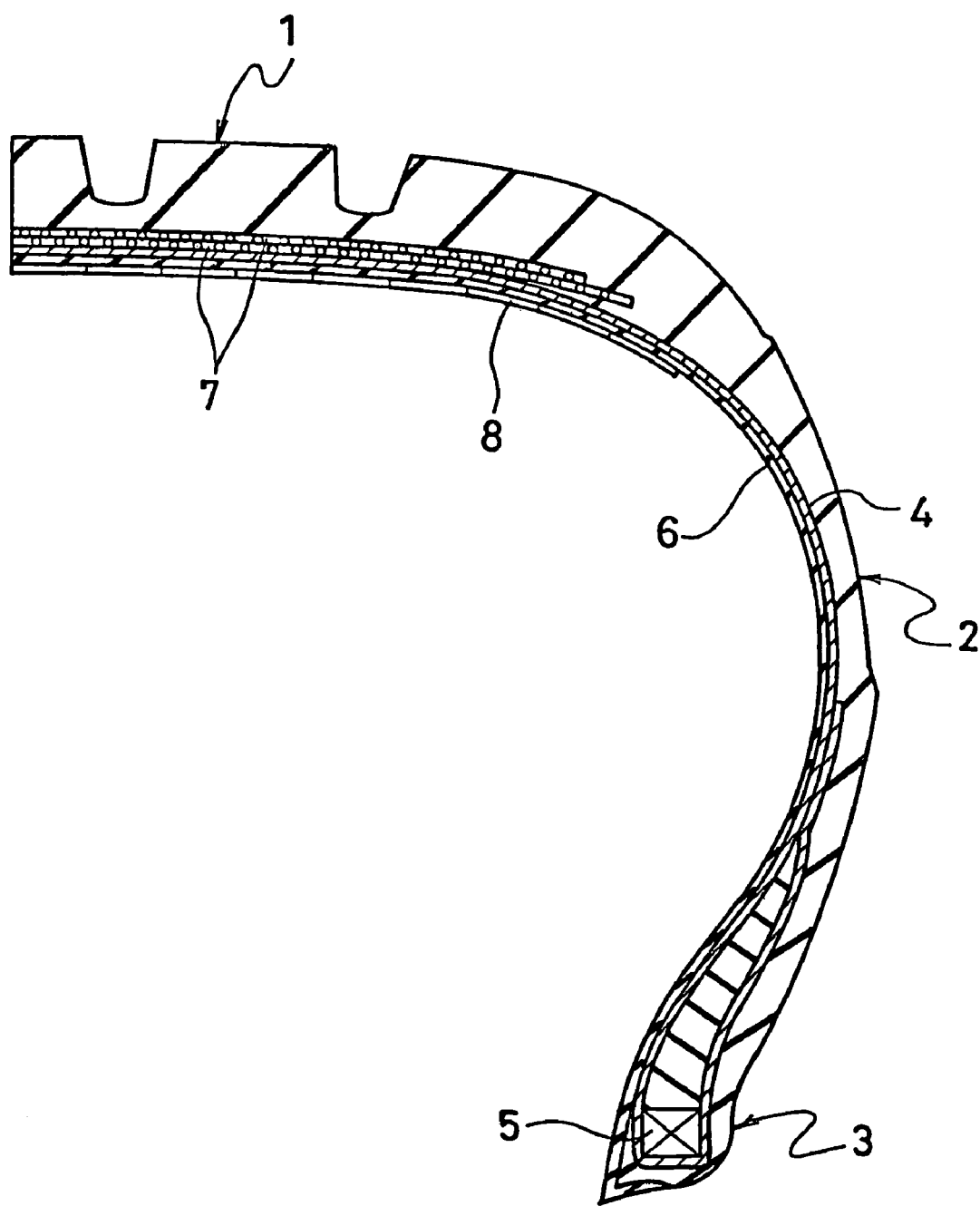
FIG. 1 is a half cross-section view of a pneumatic tire according to an embodiment of the present invention.

FIG. 1 shows a pneumatic tire according to an embodiment of the present invention, 1 is a tread portion, 2 is a side wall portion and 3 is a bead portion. A carcass layer 4 is mounted between a pair of right and left bead portions 3, 3 and an end thereof in the tire width direction is wound up from the tire inside to the outside around a bead core 5. An inner liner layer 6 is disposed inside the carcass layer 4. Moreover, a plurality of belt layers 7 are embedded in the outer peripheral side of the carcass layer 4 in the tread portion 1.

Figure 2:
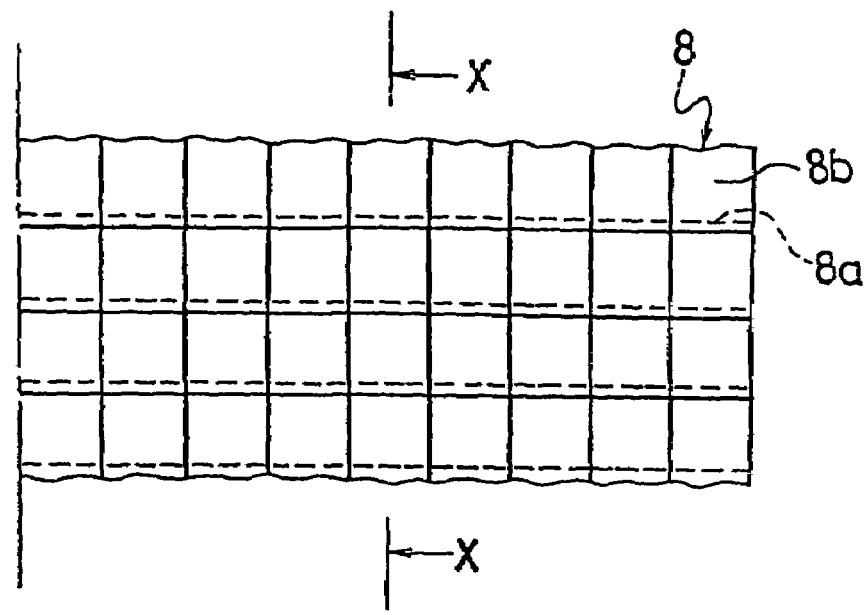
FIG. 2 is a plan view showing films in the manner of fish scales disposed on the inner surface of the pneumatic tire according to an embodiment of the present invention.
Figure 3:
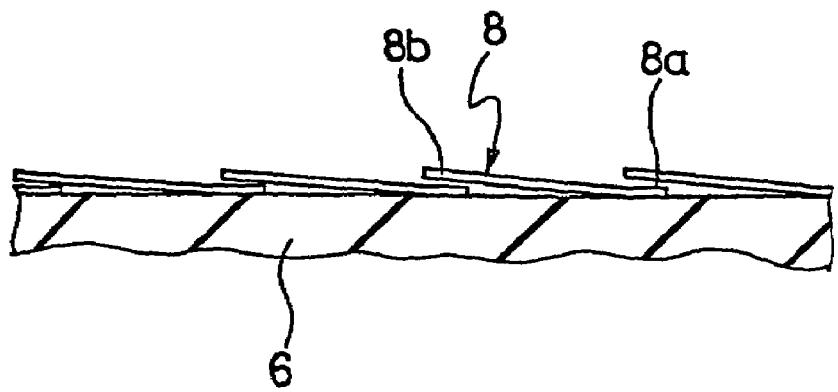
FIG. 3 is a cross-section along X—X of FIG. 2.

In the aforementioned pneumatic tire, a plurality of films 8 cut substantially square are arranged in the manner of fish scales in a region corresponding to the tread portion 1 of the inner surface of the tire. As shown in FIG. 2 and FIG. 3, respective film 8 is fixed to the inner surface of the tire along one side, this portion forms a fixed portion 8a and the other portion forms a non-fixed portion 8b. What is more, the fixed portion 8a of the film 8 is covered by the non-fixed portion 8b of the other film 8. Obviously, the non-fixed portion 8b of the film 8 and the non-fixed portion 8b of the other film 8 may be disposed to overlap partially. Moreover, the film 8 may be fixed only by a single corner. An adhesive can be used for forming such fixed portion 8a.

The material of the film 8 is not particularly limited provided that it can retain air satisfactorily and is flexible. For instance, nonmetallic materials having the flexibility, including resins such as nylon, polyethylene terephthalate (PET) or the like, rubbers such as natural rubber, butyl rubber or the like, and a thermoplastic elastomer obtained by dissipating vulcanized rubber in a thermoplastic resin, can be used.

The thickness of the film 8 can be set to 0.02 mm or more and preferably in a range from 0.02 mm to 1.0 mm. If the thickness of the film 8 is less than 0.02 mm, it is feared that the film 8 be penetrated when a nail or the like is stuck. On the contrary, if the thickness of the film 8 exceeds 1.0 mm, the film 8 deforms hardly when a nail or the like is stuck.

Area of the film 8 can be set less than 4.0 cm² and, more preferably, in a range from 1.0 cm² to 4.0 cm². If the area of the film 8 is less than 1 cm², the number of films 8 turns up to increase excessively. On the contrary, if the area of the film 8 exceeds 4.0 cm², it is feared that the film 8 be penetrated when a nail or the like is stuck. Though the shape of the film 8 is not particularly limited, it is advantageously quadrilateral such as square or the like in order to cover the inner surface of the tire effectively.

Figure 4:
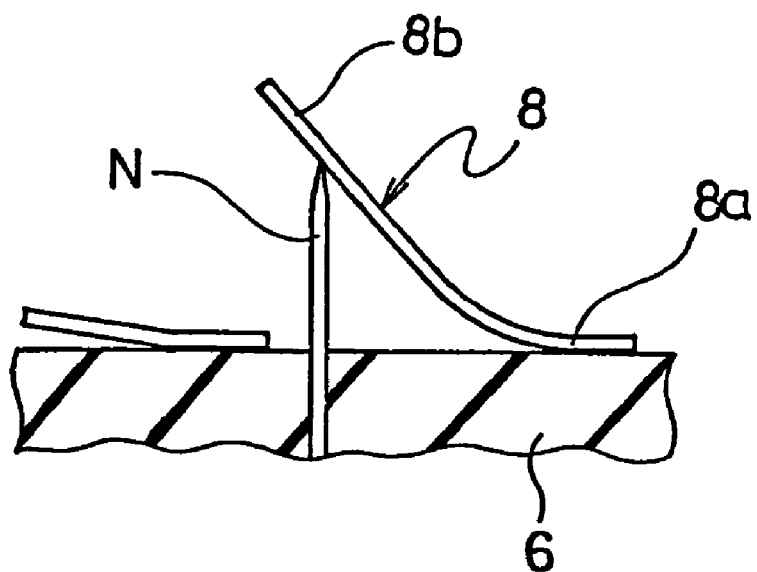
FIG. 4 is an enlarged cross-section view showing the state of the films when a nail is stuck.
Figure 5:
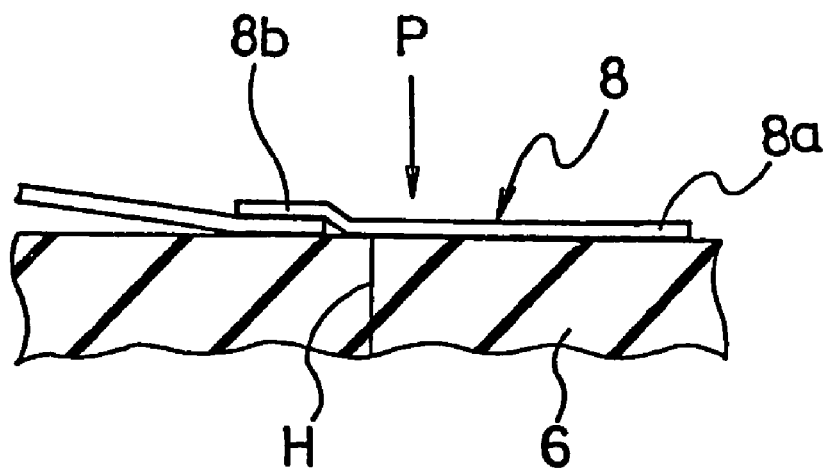
FIG. 5 is an enlarged cross-section view showing the state of the films after the nail is drawn out.

Next, a case where a nail is stuck during the running of the aforementioned tire shall be explained. First, as shown in FIG. 4, if a nail N stuck in the tread portion penetrates a belt layer 7 and projects on the inner surface of the tire, a non-fixed portion 8b of the film 8 situated in that position deforms in a way to escape from the nail N. Next, as shown in FIG. 5, if the nail N is drawn out, the non-fixed portion 8b of the film 8 that has been deformed is thrust by its own elasticity and a tire inner pressure P, returns to its original shape and ends up by obstructing a nail hole H.

Moreover, as the fixed portion 8a of the film 8 is covered by the non-fixed portion 8b of the other film 8, even when a nail stuck in the tread portion penetrates the fixed portion 8a of the film 8, it is possible to obstruct the nail hole similarly as mentioned above.

According to the embodiment mentioned above, as films 8 in the manner of fish scales are disposed in a region corresponding at least to the tread portion 1 of the inner surface of the tire, it is possible to prevent effectively puncture during running. What is more, the film 8 being made of a soft nonmetallic material, a large increase in weight or degradation of comfortable ride as in the conventional puctureless structures is not involved.

Though a case where films 8 in the manner of fish scales are disposed in the region corresponding to the tread portion of the inner surface of the tire has been described for the aforementioned embodiment, films in the manner of fish scales can be disposed also in a region corresponding to the side wall portion of the inner surface of the tire. In case where the films in the manner of fish scales are disposed in the region corresponding to the side wall portion of the inner surface of the tire, it becomes possible to prevent effectively puncture when a nail or the like is stuck in the side wall portion. What is more, the films in the manner of fish scales fixed to the inner surface of the tire would not move to the tread side even if they are subjected to the centrifugal force during the tire rotation.

Though preferred embodiments of the present invention have been described hereinabove, it should be understood that various modifications, replacements or substitutions can be made to them, without departing from the spirit and scope of the present invention defined by the attached claims.

As mentioned hereinabove, according to the present invention, a plurality of films are disposed in the manner of fish scales in at least a region corresponding to the tread portion of the inner surface of the tire, a part of respective films being fixed on the inner surface of the tire, the fixed portions of the films being covered by the non-fixed portions, it is possible to effectively prevent puncture during running without involving a large increase in weight or degradation of comfortable ride. Consequently, a pneumatic tire assuring light weight and comfortable ride and, at the same time, an excellent punctureless function can be provided.

What is claimed is:

1. A pneumatic tire comprising:
    a plurality of films disposed in the manner of fish scales in at least a region corresponding to a tread portion of an inner surface of the tire,
    each of the films being partially fixed on the inner surface of the tire and being 0.02 mm to 1.0 mm in thickness and 1.0 $cm^2$ to 4.0 $cm^2$ in area, and
    the fixed portions of the films being covered by the non-fixed portions of the other films.

2. The pneumatic tire of claim 1, wherein said films are made of nonmetallic material presenting flexibility.

3. The pneumatic tire of claim 1, wherein said films are also disposed in the manner of said fish scales in a region corresponding to a side wall portion of the inner surface of the tire.

4. The pneumatic tire of claim 1, wherein an adhesive is used for forming said fixed portion.

5. The pneumatic tire of claim 2, wherein said nonmetallic material is from the group consisting of a resin, rubber, and a thermoplastic elastomer.

6. The pneumatic tire of claim 5, wherein said resin is from the group consisting of nylon and polyethylene terephthalate.

7. The pneumatic tire of claim 5, wherein said rubber is from the group consisting of natural rubber and butyl rubber.

8. The pneumatic tire of claim 5, wherein said thermoplastic elastomer is obtained by dissipating vulcanized rubber in a thermoplastic resin.

* * * * *